United States Patent [19]

Henrichs et al.

[11] 4,350,777

[45] Sep. 21, 1982

[54] IMPERMEABLE MOLDED ARTICLES OF CELLULAR POLYURETHANE ELASTOMERS PRODUCED WITH ORGANOFUNCTIONAL POLYSILOXANE-DERIVATIVES AND THEIR USE AS SPRING ELEMENTS

[75] Inventors: Paul Henrichs, Bergisch-Gladbach; Peter Haas, Haan; Hans-Georg Hoppe, Leichlingen; Wolfgang Grimm, Leverkusen, all of Fed. Rep. of Germany

[73] Assignee: Bayer Aktiengesellschaft, Leverkusen, Fed. Rep. of Germany

[21] Appl. No.: 242,963

[22] Filed: Mar. 12, 1981

[30] Foreign Application Priority Data

Mar. 28, 1980 [DE] Fed. Rep. of Germany ....... 3012125
Aug. 1, 1980 [DE] Fed. Rep. of Germany ....... 3029272

[51] Int. Cl.$^3$ .............................................. C08G 18/38
[52] U.S. Cl. ..................................... 521/110; 521/111; 521/159; 521/163; 521/170
[58] Field of Search ................ 521/110, 111, 159, 163, 521/170

[56] References Cited

U.S. PATENT DOCUMENTS

| | | | |
|---|---|---|---|
| 3,420,782 | 1/1969 | Dahm et al. | 252/400 |
| 4,033,912 | 7/1977 | Kleimann et al. | 521/111 |
| 4,042,540 | 8/1977 | Lammerting et al. | 521/111 |
| 4,096,162 | 6/1978 | Windemuth et al. | 521/111 |
| 4,163,830 | 8/1979 | Windemuth et al. | 521/111 |
| 4,280,007 | 7/1981 | Meisert et al. | 521/159 |

FOREIGN PATENT DOCUMENTS

| | | |
|---|---|---|
| 23646 | 7/1980 | European Pat. Off. . |
| 2444405 | 3/1976 | Fed. Rep. of Germany . |
| 1224849 | 6/1960 | France . |
| 1270169 | 7/1961 | France . |
| 794403 | 5/1958 | United Kingdom . |
| 1016663 | 1/1966 | United Kingdom . |
| 1381571 | 1/1975 | United Kingdom . |

OTHER PUBLICATIONS

Plastiques Modernes et Elastomeres, Band 29, Heft 4, May, 1977, pp. 64-66-69.
Plastiques Modernes et Elastomeres, Band 29, Heft 5, Jun. 1977, pp. 58-60.

*Primary Examiner*—Maurice J. Welsh
*Attorney, Agent, or Firm*—Gene Harsh; Joseph C. Gil; Richard A. Elder

[57] ABSTRACT

This invention relates to an improved method of producing impermeable cellular polyurethane elastomers from polyisocyanates, relatively high molecular weight polyhydroxyl compounds and water as chain lengthening and blowing agent to which additional chain lengthening agents may be added and it is characterized by the use of certain silicone derivatives. The new method makes it possible for impermeable cellular molded articles to be produced without the necessity of forming a skin on the surface, of the kind known, for example, in integral skin foams.

12 Claims, No Drawings

IMPERMEABLE MOLDED ARTICLES OF CELLULAR POLYURETHANE ELASTOMERS PRODUCED WITH ORGANOFUNCTIONAL POLYSILOXANE-DERIVATIVES AND THEIR USE AS SPRING ELEMENTS

BACKGROUND OF THE INVENTION

Molded articles of cellular polyurethane elastomers are produced by known commercial processes from polyisocyanates, relatively high molecular weight polyhydroxyl compounds, water as chain lengthening and blowing agent and, optionally, additional chain lengthening agents. Cellular polyurethane elastomers differ from polyurethane foams by their substantially higher density (ca. 0.3 to 0.8 g/cm$^3$) and their superior physical properties and the possibilities of commercial application arising therefrom. Exceptionally high quality cellular polyurethane elastomers such as, for example, a product produced from 1,5-naphthylene diisocyanate, a linear polyethyleneadipate diol (molecular weight ca. 2000) and water are used on a large commercial scale for, inter alia, buffers and shock absorbing materials.

One general field of application is found in the motor vehicle industry where such materials are used primarily for shock absorbent and impact resistant buffers and bumpers. In particular, in the construction of shock absorbing struts, it is advantageous to replace the auxiliary springs made of rubber by springs made of cellular polyurethane elastomers since these differ from solid elastic materials by their substantially higher deformability. Deformations of up to 80% are quite possible in practice, for example in auxiliary springs in motor vehicles.

In the shock absorbing strut construction of motor vehicles, consisting of shock absorbers, spiral springs and a buffer of cellular elastomer, the spring elements of cellular polyurethane elastomer are pushed over the piston rod of the shock absorber. In this arrangement, the risk of soiling of the buffers frequently arises since water spray and dust are liable to penetrate the shock absorbing buffers due to their predominantly open-celled pore structure. Apart from the fact that the spring characteristics may thereby be altered, especially at low temperatures, signs of premature corrosion and abrasion are found on the piston rod of the shock absorber due to the effect of water and dirt.

In U.S. Pat. No. 4,280,007, it has already been proposed to produce cellular polyurethanes having a density of from 0.45 to 0.8 g/cm$^3$ from aromatic polyisocyanates, polyhydroxyl compounds having a molecular weight of from 400 to 6000, water and optionally glycols having a molecular weight of from 62 to 250, with the addition of from 0.1 to 0.8% by weight of aromatic diprimary diamines. The addition of aromatic diamines makes it possible for molded articles with considerably improved heat resistance to be obtained. Lower internal mold pressures are also used for their production. Such cellular polyurethanes, however, lack impermeability to water when subjected to bending stresses. In addition, it has been found that the process according to the above-identified reference ensures the production of highly uniform and, at the same time, very finely cellular structures. The product so produced is easily removed from the mold without risk of tearing or bursting. Finally, a uniform surface skin is easily formed.

It was thus an object of the present invention to provide shock absorbing spring elements which could be produced from the usual formulations and by means of the processing apparatus conventionally used in practice and which would not only have equal or even improved mechanical properties (e.g. spring characteristics) but would, in addition, be impermeable to water. If the products are to be suitable for use as shock absorbing and spring elements in the motor vehicle sector, it is essential that they should have a very low capacity for water absorption even when subjected to repeated alternating loads. At the same time, a very uniform hydrophobic cellular polyurethane elastomer (preferably one based on polyester urethanes) should be obtained by a reliable and simple process. The heat resistance and dynamic properties should also be improved. Furthermore, it was desired to find a process by which very uniform, fine cellular (micro cellular) polyurethane elastomers which are impermeable to water and have a density in the range of from 0.3 to 0.8 g/cm$^3$ could be obtained reproducibly in simple stirred-mixing apparatus and could be easily manufactured in molds.

It was surprisingly found that the aims mentioned above could be achieved by adding small quantities of substantially linear polysiloxanes, preferably organofunctional derivatives, in the preparation of the cellular elastomers, preferably at the prepolymer stage, these polysiloxanes optionally being used in the form of NCO-terminated or OH-terminated silicone prepolymers. Moreover, such additives have the effect of reducing the coefficient of sliding friction of the cellular elastomers so that the abrasion of material on the piston rod is substantially reduced when the spring element is subjected to dynamic stress. The impermeable, very finely cellular polyurethane elastomers were found to be particularly suitable for their purpose if a small quantity of aromatic diamines had been added during polyurethane synthesis because the uniformity, heat resistance and dynamic properties of the product and the reproducibility of its preparation were thereby substantially improved and the polyurethane reaction mixture was easier to handle due to the lower mold pressure which could be employed. The product, having a smooth surface, could be easily removed from the mold.

DESCRIPTION OF THE INVENTION

The subject of the present invention is thus a method of producing an impermeable, fine cellular polyurethane elastomer having a density of from 0.3 to 0.8 g/cm$^3$ by the reaction, which may be carried out stepwise, of (A) organic polyisocyanates, and in particular aromatic polyisocyanates, diisocyanates being particularly preferred, (B) polyhydroxyl compounds having a molecular weight of from 400 to 6000, and preferably from 800 to 4000, (C) water, (D) optionally organic chain lengthening agents, preferably glycols having molecular weights of from 62 to 250 and/or aromatic diamines having molecular weights of from 108 to 400, which reaction may be carried out in the presence of (E) catalysts and/or other known auxiliary agents of additives, the equivalent ratio of isocyanate groups to isocyanate reactive compounds in the overall formulation being in the range of from 0.95:1 to 1.15:1, and preferably from 1:1 to 1.1:1, characterized in that (F) from 0.1 to 3% by weight, preferably from 0.3 to 2% by weight, based on the entire reaction mixture, of one or more polysiloxanes corresponding to the following general formula

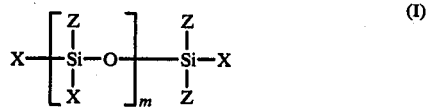

in which
m represents an integer of from 1 to 500, preferably from 5 to 250, the groups
Z which may be the same or different represent $C_1$ to $C_5$-alkyl, $C_6$ to $C_{15}$ aryl or siloxyl groups, preferably methyl and/or phenyl groups, and the groups
X have the same meaning as Z or represent H—Y—R groups, with the proviso that the polysiloxane preferably contains a total of not more than 5 and most preferably not more than 2 H—Y—R groups, in which
Y represents —NR'—; —O—;

or —S—, preferably —O—,
R represents a $C_1$ to $C_6$ alkylene group which may contain hetero atoms, preferably a methylene group, and
R' represents hydrogen, a $C_1$ to $C_6$ alkyl group or a $C_5$ to $C_9$ cycloalkyl group,
is added to the reaction mixture in one of the stages of the process,
and wherein, when X is H—Y—R, the organofunctional siloxanes may be converted into isocyanate functional or hydroxyl functional silicone prepolymers by a reaction with polyisocyanates and optionally less than equivalent quantities of chain lengthening agents.

The invention also relates to the use of the impermeable, fine cellular polyurethane elastomers which have been prepared by this process in shock absorbing spring and damping elements.

Preparation of the cellular polyurethanes may be carried out by known methods and from known starting materials (A)-(E).

The polyisocyanates (A) used for the process according to the invention may be aliphatic, cycloaliphatic, araliphatic, aromatic or heterocyclic polyisocyanates such as those described, e.g., by W. Siefken in Justus Liebigs Annalen der Chemie, 562, pages 75 to 136. Specifically useful isocyanates are those of the formula

in which
n represents 2 to 4, preferably 2, and
Q represents an aliphatic hydrocarbon group having from 2 to 18, preferably from 6 to 10 carbon atoms, a cycloaliphatic hydrocarbon group having from 4 to 15, preferably from 5 to 10 carbon atoms, an aromatic hydrocarbon group having from 6 to 15, preferably from 6 to 13 carbon atoms, or an araliphatic hydrocarbon group having from 8 to 15, preferably from 8 to 13 carbon atoms.

Specific isocyanates are 1,4-tetramethylene diisocyanate; 1,6-hexamethylene diisocyanate; 1,12-dodecane diisocyanate; or cycloaliphatic diisocyanates in the form of any mixtures of their stereoisomers, e.g., cyclobutane-1,3-diisocyanate or cyclohexane-1,3- and -1,4-diisocyanate; 1-isocyanato-3,3,5-trimethyl-5-isocyanatomethyl-cyclohexane (German Auslegeschrift 1,202,785; U.S. Pat. No. 3,401,190); 2,4- and 2,6-hexahydrotolylene diisocyanates; hexahydro-1,3- and/or 1,4-phenylene diisocyanate or perhydro-2,4'- and/or 4,4'-diphenylmethane diisocyanate. Aromatic diisocyanates are particularly suitable, such as 1,3- and 1,4-phenylene diisocyanate; 2,4- and 2,6-tolylene diisocyanate and any mixtures of these isomers; diphenylmethane-2,4'- and-/or 4,4'-diisocyanate, including alkyl-substituted and chloro-substituted derivatives thereof; and naphthylene-1,5-diisocyanate.

The following are also suitable: triphenylmethane-4,4',4''-triisocyanate; polyphenyl-polymethylene polyisocyanates such as are obtained by aniline-formaldehyde condensation followed by phosgenation, as described, e.g., in British Pat. Nos. 874,430 and 848,671; m- and p-isocyanatophenylsulfonyl isocyanates according to U.S. Pat. No. 3,454,606; perchlorinated aryl polyisocyanates as described, e.g., in German Auslegeschrift No. 1,157,601 (U.S. Pat. No. 3,277,138); polyisocyanates containing carbodiimide groups as described in German Pat. No. 1,092,007 (U.S. Pat. No. 3,152,162) and in German Offenlegungsschriften Nos. 2,504,400; 2,537,685 and 2,552,350; norbornane diisocyanates as described in U.S. Pat. No. 3,492,330; polyisocyanates containing allophanate groups as described, e.g., in British Pat. No. 994,890; Belgian Pat. No. 761,626 and Netherlands Patent Application No. 7,102,524; polyisocyanates containing isocyanurate groups, as described, e.g., in U.S. Pat. No. 3,001,973; German Pat. Nos. 1,002,789; 1,222,067 and 1,027,394 and German Offenlegungsschriften Nos. 1,929,034 and 2,004,048; polyisocyanates containing urethane groups, e.g., as described in Belgian Pat. No. 752,261 or U.S. Pat. Nos. 3,394,164 and 3,644,457; polyisocyanates containing acylated urea groups as described in German Patent No. 1,230,778; polyisocyanates containing biuret groups as described, e.g., in U.S. Pat. Nos. 3,201,372 and 3,124,605 and in British Pat. No. 889,050; polyisocyanates prepared by telomerization reactions as described, e.g., in U.S. Pat. No. 3,654,106; polyisocyanates containing ester groups as described in British Pat. Nos. 965,474 and 1,072,956; U.S. Pat. No. 3,567,763 and German Pat. No. 1,231,688; reaction products of the above-mentioned isocyanates with acetals as described in German Pat. No. 1,072,385; and polyisocyanates containing polymeric fatty acid esters according to U.S. Pat. No. 3,455,883.

The distillation residues obtained from the commercial production of isocyanates and still containing isocyanate groups may also be used, optionally dissolved in one or more of the above-mentioned polyisocyanates. Any mixtures of the above-mentioned polyisocyanates may also be used. Aromatic diisocyanates such as 1,5-naphthylene diisocyanate; 4,4'-diisocyanato-diphenylmethane, which may be mixed with minor quantities of its 2,4'-isomer; and 2,4- and 2,6-tolylene diisocyanate and mixtures thereof are preferably used.

4,4'-Diisocyanato-diphenylmethane and 1,5-naphthylene diisocyanate are particularly preferred, especially the latter.

The relatively high molecular weight polyhydroxyl compounds (B) used for the process are preferably compounds with molecular weights of from 400 to 6000, in particular from 800 to 4000, having an average of 2 to 3 hydroxyl groups, e.g., polyesters, polyethers, polythioethers, polyacetals, polycarbonates and polyester amides of the kind known for the production of homogeneous and cellular polyurethanes.

Such compounds are known and have been fully described, e.g., in German Offenlegungsschriften Nos. 2,550,796; 2,550,797; 2,624,527; 2,638,759; 2,302,564 (U.S. Pat. No. 3,963,679); 2,402,840 (U.S. Pat. Nos. 3,984,607); 2,457,387 (U.S. Pat. No. 4,035,213); 2,829,670; 2,830,949 and 2,830,953. Polyesters based on adipic acid and aliphatic diols or diol mixtures, e.g., ethylene glycol, propylene glycol, butane-1,4-diol; hexane-1,6-diol or neopentyl glycol are particularly preferred according to the invention, although polyethers based on tetramethylene oxide diols are also quite suitable.

Compounds (D) containing at least two isocyanate reactive hydrogen atoms and having a molecular weight of from 32 to 400 may also be included in the process according to the invention.

These compounds also contain hydroxyl groups and/or amino groups and/or thiol groups and/or carboxyl groups, preferably hydroxyl groups, and are compounds of the type known as chain lengthening agents or cross-linking agents which have been described in the documents mentioned above. These compounds generally have from 2 to 4 isocyanate reactive hydrogen atoms, preferably 2 or 3 such hydrogen atoms.

Examples of compounds containing hydroxyl groups include ethylene glycol, propylene glycol, trimethylene glycol, butane-1,4-diol and -2,3-diol, hexane-1,6-diol, neopentyl glycol, diethylene glycol, dipropylene glycol, diethanolamine, triethanolamine, dipropanolamine and N-methyl-diethanolamine. Other polyols, preferably with molecular weights of from 62 to 250, may also be added.

Exceptionally advantageous results for the production of cellular polyurethane elastomers are obtained if, according to U.S. Application Serial No. 147,905, minor quantities, based on the isocyanate content of the isocyanate prepolymers or of the reaction mixture, of aromatic diamines are used as compounds (D) in the reaction mixture of relatively high molecular weight polyols, excess polyisocyanates and water and, optionally, other low molecular weight chain lengthening agents. The aromatic diamines used as compounds (D) have a molecular weight of from 108 to 400, preferably from 108 to 250. An addition of from 0.1 to 0.8% by weight, preferably from 0.15 to 0.5% by weight of aromatic diamines in the whole reaction mixture is very advantageous for obtaining uniform cell structure and improved heat endurance.

Examples of aromatic diamines include bisanthranilic acid esters according to German Offenlegungsschriften Nos. 2,040,644 and 2,160,590; 3,5- and 2,4-diaminobenzoic acid esters according to German Offenlegungsschrift No. 2,025,900; the diamines with ester groups described in German Offenlegungsschriften 1,803,635 (U.S. Pat. Nos. 3,681,290 and 3,736,350); 2,040,650 and 2,160,589; the diamines with ether groups according to German Offenlegungsschriften Nos. 1,770,525 and 1,809,172 (U.S. Pat. Nos. 3,654,364 and 3,736,295); 2-halogen-1,3-phenylene diamines which may be substituted in the 5-position (German Offenlegungsschriften Nos. 2,001,772; 2,025,896 and 2,065,869); 3,3'-dichloro-4,4'-diamino-diphenylmethane; 2,4- and/or 2,6-tolylenediamine; tolylenediamine substituted by one or two $C_1$ to $C_3$ alkyl groups, e.g., 3,5-diethyl-2,4- or -2,6-diaminotoluene; 4,4'-diamino-diphenylmethane and 2,4'-diamino-diphenylmethane and their derivatives substituted with 1 to 4 $C_1$ to $C_4$ alkyl groups, e.g., 3,3'-dimethyl-4,4'-diamino-diphenylmethane; 3,3,5,5'-tetraethyl-4,4'-diamino-diphenylmethane and 3,3'-diisopropyl-4,4'-diamino-diphenylmethane, etc. and their derivatives substituted with 1 to 4 chlorine groups; 4,4'-diamino-diphenyldisulfides (German Offenlegungsschrift No. 2,404,976); diamino-diphenyldithioether (German Offenlegungsschrift No. 2,509,404); and aromatic diamines substituted with alkylthio groups (German Offenlegungsschrift No. 2,638,760). The diamines used are preferably analogous in their structure to the diisocyanate used. Thus, tolylene diamine and substituted tolylene diamines are preferred for the reaction with 2,4- and 2,6-tolylene diisocyanate, whereas prepolymers based on 4,4'-diisocyanatodiphenylmethane are preferably reacted with substituted or unsubstituted diamino-diphenylmethanes. Naphthylene-1,5-diisocyanate is preferably combined with 1,5-diaminonaphthalene but the combination of 1,5-diaminonaphthalene with 4,4'-diisocyanato-diphenylmethane also gives rise to valuable products. It is surprisingly found that even very small quantities of the diamine, preferably from 0.15 to 0.5% by weight, based on the total quantity of polyurethane, have the desired action according to the invention.

4,4'-Diamino-diphenylmethane and its methyl and chloro substitution products are preferred, optionally in admixture with 2,4'-diamino-diphenylmethane, 1,5-diaminonaphthalene and 2,4- and/or 2,6-tolyenediamines.

The combination of 1,5-naphthylene diisocyanates and 1,5-diaminonaphthalene is quite particularly preferred. The diprimary diamine may be added to the reaction mixture at any stage of the process, e.g., as a mixture with one of the starting components. The most suitable procedure is generally to use the diamine in the form of a solution in a part of the relatively high molecular weight polyhydroxyl compound used in the second stage of the process. For convenience, it is often advantageous if a small quantity of the aromatic diisocyanate used is added to this diamine solution in a separate step of the process. The molar ratio of diamine to diisocyanate in this step should be within the range of from 2:1 to 10:9, and due to the virtually selective reaction between the isocyanate and $HN_2$ groups, amine ureas corresponding to the general formula

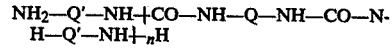

are formed in situ in the polyol in a quantity of about 0.2 to 1% by weight, based on the polyurethane. In the above formula, n represents an integer of from 1 to 11, Q represents the group obtained by removal of the isocyanate groups from the diisocyanate, and Q' represents the group obtained on removal of the amino groups from the diamine.

According to a second preferred method of procedure, the diamine is added to the isocyanate prepolymer of the first step of the process, optionally even while it is being prepared. An isocyanate prepolymer modified with small quantities of urea groups is then obtained. According to one variation of this method, the diamine is prepared in situ in the prepolymer by adding an equivalent quantity of water instead of the diamine, so that the diisocyanate is converted into the corresponding diamine by saponification.

The catalysts, additional blowing agents, foam stabilizers, pigments, stabilizers against aging and weathering and other known auxiliary agents and additives under (E), which are well known and have been described in some detail in the documents mentioned above, are optionally used in the process according to the invention.

Surface active additives such as emulsifiers and foam stabilizers may also be used. Suitable emulsifiers include, e.g., the sodium salts of ricinoleic sulfonates and salts of fatty acids and amines, such as oleic acid diethylamine or stearic acid diethanolamine. Alkali metal and ammonium salts of sulfonic acids, such as dodecylbenzene sulfonic acid or dinaphthylmethane disulfonic acid or of fatty acids such as ricinoleic acid or of polymeric fatty acids may be used as surface active additives.

Water is preferably used both as chain lengthening agent and as blowing agent in the process according to the invention but the chain lengthening agents exemplified above may be used in addition to water. The quantity of water used is generally from 0.5 to 2% by weight, based on the total mixture of all the reactants, preferably from 0.7 to 1.2% by weight. It is generally used in the form of an aqueous solution of an emulsifier of the type exemplified. This ensures intimate mixing of the water with the other reactants.

The cellular polyurethane elastomer molded products are preferably produced by the known prepolymer process, i.e., an isocyanate prepolymer is prepared from the relatively high molecular weight polyol and the diisocyanate in an NCO/OH equivalent ratio within the range of from 1.5:1 to 3:1, preferably from 1.8:1 to 2.2:1, and this prepolymer is subsequently reacted with the quantity of water mentioned above. The well known one-shot process may be employed but is not preferred. Organic chain lengthening agents, if used, are added in the quantities normally used for the production of polyurethane elastomers or in only slight quantities as has been described for aromatic diamines.

The individual reactants for the production of the polyurethane elastomers are otherwise used in the quantities required to produce an isocyanate index of from 100 to 115. This applies both to the preferred reaction of isocyanate prepolymers with water and to the proportions of individual reactants used in the one-shot process, which is less preferred for the purpose of the invention.

The quantity of reaction mixture to be introduced into the mold is calculated so that the above-mentioned density of from 0.3 to 0.8 g/cm$^3$ results. Mechanical devices may be used for preparing the reaction mixtures and for filling the mold, e.g., those devices described in U.S. Pat. No. 2,764,565. Details of processing apparatus which may also be used according to the invention are described in Kunststoff-Handbuch, Volume VII, published by Vieweg and Höchtlen, Carl-Hanser-Verlag, Munich, 1966, e.g., on pages 121 to 205.

The material of the mold may be a metal, e.g. aluminum, or a plastics material, e.g. an epoxide resin. The reaction mixture fills the mold and forms the molded article.

It is essential according to the invention to use from 0.1 to 3% by weight, preferably 0.3 to 2% by weight, based on the whole reaction mixture, of one or more polysiloxanes (F) of the general formula (I) defined above. The polysiloxane may be added at any point during preparation of the cellular polyurethane elastomers.

They are preferably used together with the polyol component when the one-shot process is employed. In the prepolymer process, they are preferably mixed either with the isocyanate prepolymer of the first process stage or with the polyol component used in the second stage.

Polysiloxanes of the general formula (I) in which X has the same meaning as Z have been known for a long time as chemically inert silicone oils. The preparation as well as the physical chemical properties of these products are described in detail in W. Noll, "Chemie und Technologie der Silicone," 2nd Edition, 1968, Verlag Chemie, Weinheim/Bergstrasse, Federal Republic of Germany. For the purposes of the present invention, it is particularly suitable to use those silicone oils which have an average of about 5 to 400, most preferably 20 to 250 siloxane units and in which X and Z represent methyl groups or a proportion thereof, and up to about 50% also represent phenyl groups. Polysiloxanes of this type are also described, e.g., in German Offenlegungsschrift No. 2,232,525. In the process according to the invention, silicone oils are preferably only added in quantities of from 0.1 to 2% by weight and, in particular, from 0.3 to 1% by weight, based on the whole reaction mixture, since the molded articles produced may have inferior mechanical properties if higher proportions are used.

For the purpose of the invention, however, it is preferred to use polysiloxanes which have at least one, and preferably from 1 to 5, most preferably 2 isocyanate reactive "organofunctional" groups, and in particular hydroxyl or amino groups. Compounds of this type are known and have been described in German Auslegeschriften Nos. 1,114,632; 1,190,176 and 1,248,287 and French Pat. No. 1,291,937. They contain at least two carbofunctional groups which are attached to silicon and carry isocyanate reactive hydrogen atoms. The carbofunctional groups are preferably aliphatic hydrocarbon groups with from 1 to 6 carbon atoms containing at least one hydroxyl carboxyl, mercapto or primary or secondary amino group, which may also contain hetero atoms.

The following are examples of such carbofunctional groups:

hydroxymethyl
—CH$_2$OH
hydroxybutyl
—(CH$_2$)$_4$OH
β-hydroxyethyloxymethyl
—CH$_2$—O—CH$_2$—CH$_2$—OH
β-hydroxyethyl mercaptomethyl
—CH$_2$—S—CH$_2$—CH$_2$—OH
β,-dihydroxypropyl mercaptomethyl
—CH$_2$—S—CH$_2$—CHOH—CH$_2$—OH
mercaptomethyl
—CH$_2$SH
β-mercaptoethyl mercaptomethyl
—CH$_2$—S—CH$_2$—CH$_2$—SH
β-carboxyethyl
—CH$_2$—CH$_2$—COOH
aminomethyl
—CH$_2$—NH$_2$
—aminobutyl
—(CH$_2$)$_4$—NH$_2$ n-butylaminomethyl
—CH$_2$—NH—C$_4$H$_9$ or
cyclohexylaminomethyl
—CH$_2$—NH—C$_6$—H$_{11}$.

The organopolysiloxanes are obtained by known methods. Hydroxymethyl polysiloxanes, for example, which are particularly suitable, may be prepared by the direct reaction of bromomethylpolysiloxanes with alcoholic potassium hydroxide solution. 4-Aminobutyl-polysiloxanes are prepared by hydrogenation of readily accessible nitriles while suitable carboxyl derivatives are obtained by saponification of corresponding cyanoalkyl silicon compounds. Aminomethylsiloxanes are obtained by the amination of halogenmethyl silicon compounds with ammonia or primary amines.

The functional groups are, in many cases, first introduced into low molecular weight siloxanes and the resulting products are then converted into higher molecular weight polysiloxanes by the known equilibration reaction.

Organopolysiloxanes having at least two, in particular from 5 to 100 siloxane groups and a molecular weight of from 194 to 8000, especially from 800 to 3000, are preferred according to the invention. Moreover, it is preferred to use organofunctional polysiloxanes which are substantially linear and those which have hydroxyl or amino end groups.

The following are examples of organofunctional polysiloxanes which are suitable for the process according to the invention:

n = 1 to 100

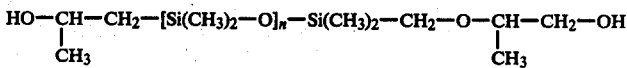

n = 1 to 100

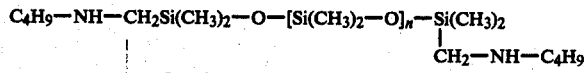

n = 5 to 60 or

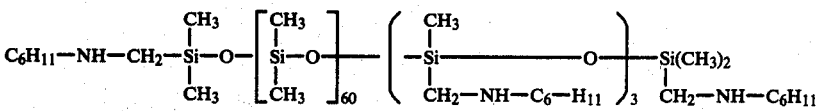

Organopolysiloxanes which are particularly preferred for the purpose of the invention are those corresponding to the following general formula

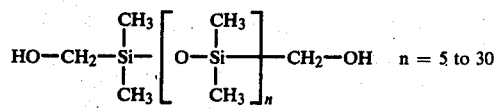 n = 5 to 30

They are obtained in known manner by the equilibration of 1,1,3,3-tetramethyl-1,3-hydroxymethyldisiloxane corresponding to the following formula

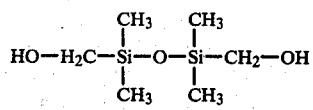

with octamethylcyclotetrasiloxane in the presence of sulfuric acid or by the process described in German Auslegeschrift No. 1,236,505.

The organopolysiloxanes may be used as such in the process according to the invention but they are preferably first converted into a prepolymer. For this purpose, they are prereacted with one of the above-mentioned polyisocyanates, using an equivalent ratio of NCO/active H approximately in the range of from 1.5:1 to 3:1, preferably about 2:1. It is particularly preferred to convert the resulting isocyanate prepolymer in a subsequent step into a hydroxyl prepolymer by reacting it with an excess of low molecular weight and/or relatively high molecular weight polyol before it is added to the reaction mixture for the production of cellular molded products.

The reaction between organofunctional polysiloxane and polyisocyanate is preferably carried out at a temperature within the range of from 30° to 100° C., optionally with the addition of suitable catalysts such as, for example, organic tin compounds such as tin-(II)acetate, tin-(II)octoate, tin-(II)alkyl hexoate or dibutyl tin diacetate. If excess quantities of polyisocyanate have been used, they may be removed by thin layer distillation before the next reaction stage although any excess of unreacted polyisocyanate may also be left in the reaction mixture used for the next stage.

This next reaction stage consists of the reaction of the isocyanate-polysiloxane prepolymers with alcohols or aminoalcohols which are at least difunctional in the isocyanate polyaddition reaction. These reactants are compounds within the molecular weight range of from 62 to 5000, preferably from 105 to 300 which, as already stated, are at least difunctional or preferably trifunctional in the isocyanate addition reaction and, apart from alcoholic, i.e. aliphatically bound hydroxyl groups, and primary or secondary nonaromatically bound amino groups, they preferably have no other isocyanate reactive groups. They may, however, contain hetero atoms which are inert in the isocyanate addition reaction, for example in the form of ether bridges, tertiary nitrogen atoms, amide groups or ester groups. It is particularly preferred to use compounds containing groups which differ in their reactivity towards isocyanate groups, such as amino alcohols having a primary or secondary amino group and two alcoholic hydroxyl groups. The following are typical examples of such compounds:

well as hydroxy functional and/or aminopolyhydroxy functional compounds based on carbohydrates, e.g., glucosamine and galactosamine, are further examples of suitable compounds, although they are less advantageous than the exemplified starting materials mentioned earlier.

The reaction of the NCO-polysiloxane-prepolymers

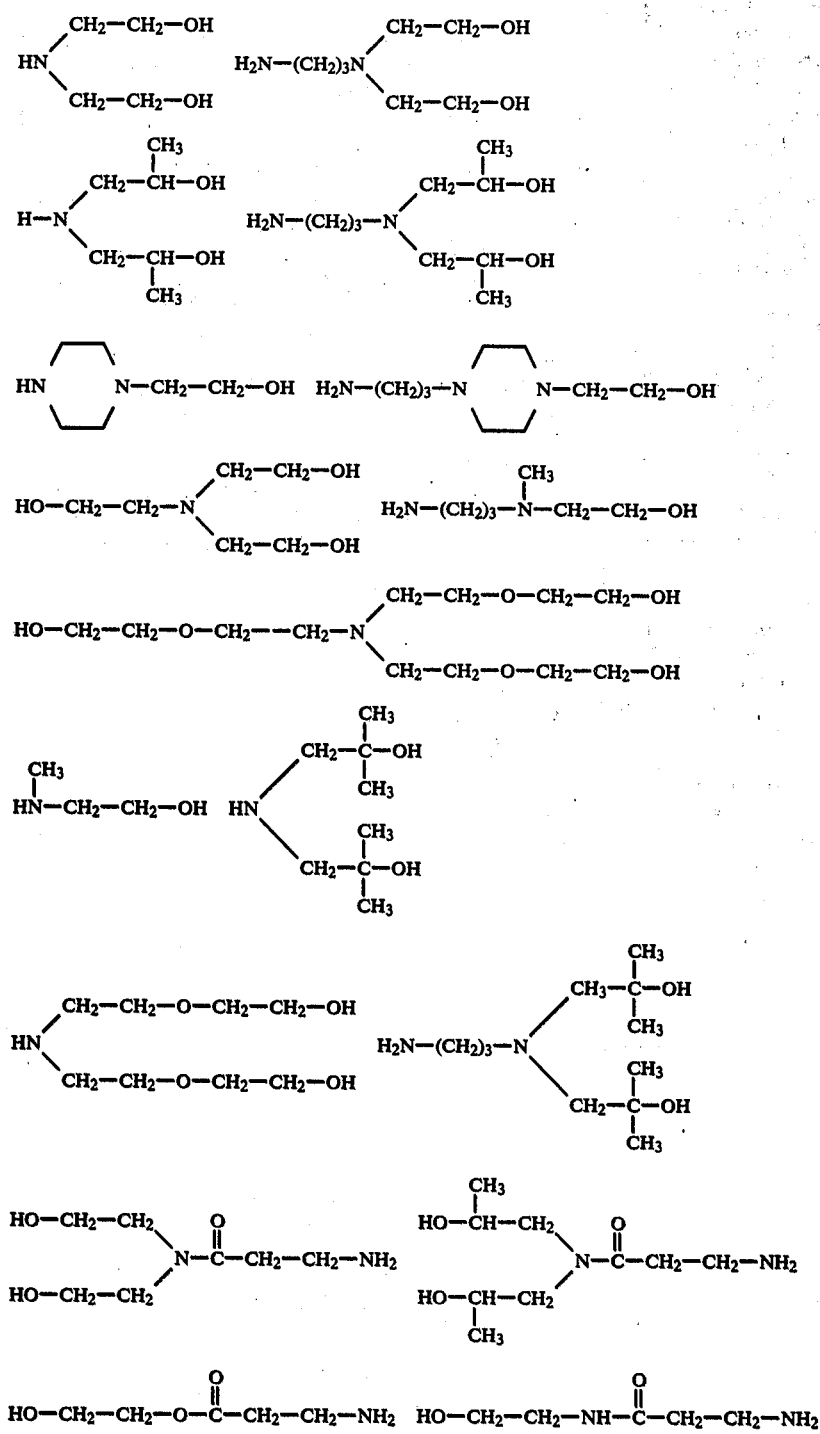

The alkoxylation products of these exemplified compounds may also be used, but are less preferred. The amino alcohols described in German patent application No. P 29 36 239.8 and the hydrogenation products mentioned in German Offenlegungsschrift No. 2,756,270 as with the aminopolyhydroxy functional compounds, such as the aminoalcohols which are preferred according to the invention and are described above, may also be performed in the presence of the higher molecular polyhydroxy compounds (B).

To prepare the reaction products of the isocyanate polysiloxane prepolymer and the polyol and/or the aminoalcohols, the starting materials are generally used in an equivalent ratio of isocyanate groups to active hydrogen atoms within the range of from 1:1.5 to 1:6, preferably from 1:2 to 1:4. It is particularly preferred to maintain an NCO/NH ratio of about 1:1. The reaction is generally carried out within a temperature range of from 30° to 100° C., optionally which the addition of the catalysts already mentioned which accelerate the isocyanate addition reaction. The hydroxyl prepolymers obtained by this method preferably have a hydroxyl functionality of from 2 to 4 and a hydroxyl end group content of from 0.8 to 5 and preferably contain from 30 to 90% by weight of structural units of the formula $-O-Si(R)_2-$.

Particularly advantageous results are obtained in the process according to the invention by using organopolysiloxanes which may be modified as described above in combination with the above-mentioned inert silicone oils (X=Z), using a proportion by weight of the two polysiloxane components within a range of from 4:1 to 1:4, most preferably from 2:1 to 1:2.

A further improvement in the properties of the molded articles produced according to the invention is obtained by providing them on the surface with a continuous, dense, nonporous skin of polyurethane or polyurethane urea having a thickness of from 0.05 to 1 mm, preferably from 0.1 to 0.5 mm, most preferably from 0.2 to 0.3 mm, as a sealing layer. The skin on the surface of the molded article may be obtained by dipping or spraying the article but is preferably obtained by the so-called in-mold coating method of spraying the mold itself. Any known one-component or two-component polyurethane lacquers based on the above-mentioned starting compounds may be used, although compositions consisting of aliphatic or cycloaliphatic compounds are preferred. From an ecological and environmental point of view, it is preferred to use aqueous solutions or dispersions of polyurethanes or polyurethane ureas, and ionic and emulsifier-free products are particularly preferred for their bonding characteristics.

The one-component and two-component polyurethanes to be used for surface sealing in the process according to the invention are known from the art of lacquering and coating. The so-called two-component polyurethanes are reactive systems consisting, for example, of a prepolymer containing isocyanate groups and a suitable chain lengthening agent, usually an aromatic diamine. These two components, diluted with a solvent, are applied to the molded article separately or together, by immersion or spraying.

Lacquers of this type are known and have been described, for example, in German Pat. Nos. 838,826 and 872,268, German Auslegeschriften No. 1,023,449 and 1,240,656 (U.S. Pat. No. 3,281,396) and, in particular, in German Offenlegungsschrift No. 1,570,524 (U.S. Pat. No. 3,475,266).

Conversely, the two-component polyurethanes may, of course, also be obtained from a low molecular weight polyisocyanate and a relatively high molecular weight prepolymer still containing isocyanate reactive groups. One such system has been described, e.g., in German Offenlegungsschrift No. 2,221,756 (U.S. Pat. No. 3,904,796).

In contrast to the two-component polyurethanes, which have been known for some time, the so-called one-component polyurethanes are most recent in the art. These high molecular weight products, which are already completely reacted, are obtained by reacting a mixture of polyhydroxyl compounds, in most cases dihydroxypolyesters or dihydroxypolyethers, and glycols, preferably ethylene glycol or butanediol, with aromatic diisocyanates, preferably 4,4'-diphenylmethane diisocyanate. These mainly linear polyurethanes, which may be prepared either solvent-free or in solution, are used in the form of solutions or solvent mixtures containing dimethylformamide and/or other highly polar compounds. One advantage of the one-component polyurethanes is their relatively unlimited pot life. Apart from the so-called aromatic one-component polyurethanes synthesized from aromatic diisocyanates, the one-component polyurethanes known in the art also include the so-called aliphatic one-component polyurethanes, which are polyurethane ureas obtained from relatively high molecular weight dihydroxyl compounds, aliphatic diisocyanates and aliphatic diamines or bis-hydrazides, bis-semicarbazides and bis-carbazic acid esters as chain lengthening agents. These aliphatic one-component polyurethanes are applied as solvent mixtures containing secondary or primary alcohols in addition to aromatic hydrocarbons.

According to the invention, it is preferred, however, to seal the surfaces with aqueous solutions and, in particular, with film-forming aqueous dispersions of polyurethanes or polyurethane ureas, which are also known from the coating industry.

The polyurethane dispersions may contain anionic, cationic and/or nonionogenic dispersion centers and may also contain external emulsifiers.

Suitable aqueous polyurethane dispersions and solutions are known and have been described, for example, by D. Dieterich et al in J. Oil Col. Chem. Assoc., 1970, 53, pages 363–379; in Die Angewandte Makromolekulare Chemie, 1972, 26, pages 85 to 106; in Angewandte Chemie, 1970, 82, pages 53–63; in U.S. Pat. No. 4,086,193 (ionic dispersions) and in German Offenlegungsschriften Nos. 2,550,860; 1,495,745 (U.S. Pat. No. 3,479,310); 1,495,770 (U.S. Pat. No. 3,535,274); 1,495,847 (Canadian Pat. No. 764,009); 1,770,068 (U.S. Pat. No. 3,756,992); 2,314,512; 2,141,807; 2,314,513 and 2,343,294 (U.S. Pat. No. 3,989,869).

Aqueous polyurethane solutions have also been described in French Pat. Nos. 2,308,646 and 2,331,581 and in German Offenlegungsschrift No. 2,730,514.

Preferred polyurethane dispersions are those obtained from polyhydroxypolyesters, hexane diisocyanate and/or isophorone diisocyanate and ethylene diamine-ethyl sulfonate corresponding to the formula

$$H_2N-CH_2-CH_2-NH-CH_2-CH_2-SO_3-Na.$$

According to the invention, it is frequently preferred to use aqueous polyurethane dispersions or solutions of the kind which can subsequently be cross-linked. This may be effected by, for example, the introduction of N-methylol groups, e.g. by treatment with formaldehyde, which cross-link in known manner to form methylene groups, preferably in the presence of acid catalysts.

Sealing of the surface of the molded articles is carried out by subsequently applying the coating agents or dispersions exemplified above to the prefinished molded article or, preferably, by coating the internal surface of the mold with one of the exemplified coating agents or dispersions before the mold is filled.

When the internal surface of the mold has been coated in this manner, the skin is produced by leaving the coating to react and partially dry. The coating agents or dispersions are generally used in the quantities required to produce a dense skin having a thickness of from 0.05 to 1 mm, preferably from 0.1 to 0.5 mm, most preferably from 0.2 to 0.3 mm.

The molded articles produced according to the invention are suitable above all for use as shock absorbing spring elements, damping and impact resistant buffers or bumpers of all types and seals for motor vehicles and, in particular, for automobiles.

The following Examples serve to explain the process according to the invention. The quantities given are to be understood as parts by weight or percentages by weight unless otherwise indicated.

The experiments were carried out in agitator mixers of the kind normally used for processing liquid polyurethane systems (SK and EZ-AB machines of Hennecke).

Buffer elements having a density of about 500 g/dm$^3$ were produced in suitable molds whose feed openings were closed by a cover pressed down by a toggle lever.

The amount of water absorbed after various degrees of deformation was determined on coated and uncoated buffer elements, in some cases before and after a dynamic test under water.

The samples used for determining the dynamic properties were taken from rectangular blocks. The steel mold used for producing the blocks had a square base measuring 120×120 mm and a height of 100 mm. It was sealed at the top by a steel plate which was pressed down on to the 1 cm wide edge of the mold by means of toggle levers.

The silicone oil used in Example 1 corresponds to the following general formula

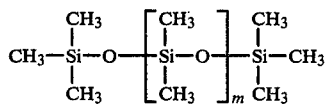

in which m has an average value of about 200.

The organopolysiloxane used in Examples 1, 2 and 3 corresponds to the following general formula

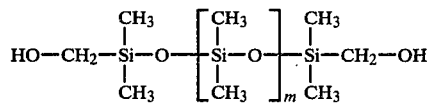

in which m has an average value of from 10 to 13.

This organopolysiloxane is also used for the preparation of the organopolysiloxane prepolymers used in the subsequent Examples.

EXAMPLES

EXAMPLE 1

(a) Comparison experiment:

A prepolymer was prepared from 100 parts of a linear polyethyleneadipate diol (molecular weight 2000) and 24 parts of 1,5-naphthylene diisocyanate.

2.15 parts of a 50% aqueous solution of a fatty acid sulfonate were then mixed vigorously with 124 parts of the prepolymer and the mixture was poured into a mold which had been heated to 70° C. The molded article, obtained after 30 minutes' heating at 90° C., showed considerable uptake of water after repeated deformations in the pressure test under water. The results obtained are summarized in Table 1.

(b) Process according to the invention:

The quantity of organopolysiloxane and/or silicone oil indicated in Table 1 was added to 100 parts of the above-mentioned linear polyethyleneadipate. The prepolymer was then prepared from this mixture and 24 parts of 1,5-naphthylene diisocyanate.

2.12 parts of a 50% aqueous solution of the fatty acid sulfonate and 125.25 parts of the prepolymer were then mixed vigorously and the mixture was poured into the mold which was at a temperature of 70° C. The molded article obtained on removal from the mold absorbed considerably less water in the pressure test under water than the article in the comparison experiment.

TABLE 1

Water absorption after 55% deformation of the body under water (15 cycles; rate of deformation: 100 mm/min).

| Polysiloxane (parts) | | Zero weight (g) | Water absorption | |
|---|---|---|---|---|
| | | | (g) | (%) |
| — | | 107.44 | 71.88 | 66.9 |
| 0.75 | silicone oil | 106.99 | 1.29 | 1.21 |
| 0.75 | organopolysiloxane | 105.10 | 0.71 | 0.68 |
| 0.50 | silicone oil + | | | |
| 0.25 | organopolysiloxane | 103.11 | 0.52 | 0.5 |

EXAMPLE 2

Example 1(b) was repeated but using 0.75 parts of a polysiloxane prepolymer which had been prepared by the reaction of 2 mol of the organopolysiloxane with 3 mol of tolylene diisocyanate (80%, 2,4-isomer) and then with a quantity of diethanolamine equimolar to the number of free isocyanate groups.

The pressure test was carried out under more stringent conditions than in Example 1 in that the article was left for two minutes in the compressed state and for two minutes in the relaxed state before the next cycle was begun. The water absorption is nevertheless very low.

TABLE 2

| Zero weight | Water absorption | |
|---|---|---|
| (g) | (g) | (%) |
| 109.77 | 0.56 | 0.51 |

EXAMPLE 3

Example 1(b) was repeated, using 0.75 parts of various hydroxyl polysiloxane prepolymers described below. The results are summarized in Table 3.

(a) Preparation of modified organopolysiloxanes A to J (A) 252 g of hexamethylene diisocyanate are introduced dropwise into 1400 g of an α,ω-hydroxymethyl-polydimethyl siloxane with a hydroxyl number of 80. The mixture is heated to 50° C. until the prepolymer has an isocyanate content of 2.54%. 105 g of diethanolamine are then added at 50° C. with stirring and the reaction mixture is left at this temperature until no more isocyanate can be detected. A modified polysiloxane is obtained, having a viscosity of 550 mPas/25° C., a hydroxyl functionality of 4, a hydroxyl end group content of 2% and a dimethylsiloxane unit content of 71% by weight.

(B) 252 g of hexamethylene diisocyanate are introduced dropwise into 1400 g of an α,ω-hydroxymethylpolydimethylsiloxane with a hydroxyl number of 80. The mixture is heated to 50° C. until the prepolymer has an isocyanate content of 2.54%. 281 g of tris[2-(2-hydroxyethoxy)-ethyl]-amine are then added at 50° C. and the reaction mixture is left at this temperature until no more isocyanate can be detected. A modified organopolysiloxane is obtained. Its viscosity is 920 mPas/25° C., its hydroxyl functionality 4 and its hydroxyl end group content 1.6% by weight, and it contains 65% by weight of dimethyl siloxane units.

(C) 252 g of hexamethylene diisocyanate are introduced dropwise into 1400 g of an α,ω-hydroxymethylpolydimethylsiloxane with a hydroxyl number of 80. The mixture is heated to 50° C. until the prepolymer has an isocyanate content of 2.54%. 133 g of diisopropanolamine are then added at 50° C. and the mixture is left at this temperature until no more isocyanate can be detected.

A modified organopolysiloxane having a viscosity of 35,950 mPas/25° C. and a hydroxyl functionality of 4 is obtained. It contains 1.9% by weight of hydroxyl end groups and 76% by weight of dimethylsiloxane units.

(D) 252 g of hexamethylene diisocyanate are introduced dropwise into 570 g of an α,ω-hydroxymethylpolydimethylsiloxane haing a hydroxyl number of 22. The mixture is heated to 50° C. until the prepolymer has an isocyanate content of 5.12%. 133 g of diisopropanolamine are then added at 50° C. and the reaction mixture is left at this temperature until no more isocyanate can be detected. A modified organopolysiloxane having a viscosity of 31,500 mPas/25° C. and a hydroxyl functionality of 4 is obtained. It contains 1.7% by weight of hydroxyl end groups and 70% by weight of dimethylsiloxane units.

(E) 1100 g of an α,ω-hydroxymethylpolydimethylsiloxane with a hydroxyl number of 80 are heated to 90° C. with 60 g of hexamethylene diisocyanate and 0.2 g of tin-(II)ethylhexoate until no isocyanate can be detected. The prelengthened polysiloxane is reacted with 99 g of hexamethylene diisocyanate at a temperature of 50° C. until the isocyanate content is 1.3%. 40 g of diethanolamine are then added and the reaction mixture is left at this temperature until no more isocyanate can be detected. A modified organopolysiloxane of pasty consistency is obtained. It has a hydroxyl functionality of 4 and contains 0.99% by weight of hydroxyl end groups and 87% by weight of dimethylsiloxane units.

(F) 1400 g of an α,ω-hydroxymethylpolydimethylsiloxane with a hydroxyl number of 56 and 212 g of hexamethylene diisocyanate are heated to 50° C. until an isocyanate content of 2.54% is obtained. 1970 g of a polypropylene oxide with a hydroxyl number of 56 which has been started on isopropanol/water are then added and the temperature is maintained at 50° C. until no more isocyanate can be detected. A modified organopolysiloxane having a viscosity of 360 mPas/25° C. and hydroxyl functionality of 2 is obtained. It contains 0.94% by weight of hydroxyl end groups and 37% by weight of dimethylsiloxane units.

(G) 1400 g of an α,ω-hydroxymethylpolydimethylsiloxane with a hydroxyl number of 56 and 375 g of 4,4'-diisocyanato-diphenylmethane are reacted at 50° C. until an isocyanate prepolymer having an isocyanate content of 2.4% by weight is obtained. 105 g of diethanolamine are then added and the temperature is maintained at 50° C. until no more isocyanate can be detected. A modified organopolysiloxane having a viscosity of 26,500 mPas/50° C. and a hydroxyl functionality of 4 is obtained. It contains 1.8% by weight of hydroxyl end groups and 72% by weight of polydimethylsiloxane units.

(H) 840 g of an α,ω-hydroxymethylpolydimethylsiloxane having a hydroxyl number of 80 and 156 g of a mixture of 2,4- and 2,6-tolylene diisocyanate (80:20) are heated to 50° C. until the isocyanate index is 1.26%. 32 g of diethanolamine are then added to the prepolymer and the reaction mixture is maintained at this temperature until no more isocyanate can be detected. A modified organopolysiloxane having a viscosity of 1530 mPas/25° C. and a hydroxyl functionality of 4 is obtained. It contains 1.0% by weight of hydroxyl end groups and 83% by weight of dimethylsiloxane units.

(I) 570 g of an α,ω-hydroxymethylpolydimethylsiloxane with a hydroxyl number of 197 and 252 g of hexamethylene diisocyanate are heated to 50° C. until the isocyanate content is 5.2%. 133 g of diisopropanolamine are then added and the mixture is maintained at this temperature until no more isocyanate can be detected. A modified organopolysiloxane having a viscosity of 60,300 mPas/25° C. and a hydroxyl functionality of 4 is obtained. It contains 3.6% by weight of hydroxyl end groups and 58% by weight of dimethylsiloxane units.

(J) 0.5 g of p-toluenesulfonic acid methyl ester are added at room temperature to 770 g of α,ω-bis-(hydroxymethyl)-polydimethylsiloxane having a hydroxyl number of 80. The mixture is heated to 70° C. under a nitrogen atmosphere. 220 g of a mixture of 2,4- and 2,6-tolylene diisocyanate (80:20) are added at this temperature. The reaction mixture is heated to 150° C. and left at this temperature for six hours. Readily volatile constituents are then drawn off in a water jet vacuum. The prepolymer obtained has an isocyanate content of 6.6%. 1000 g of the above-mentioned prepolymer are rapidly stirred into 209 g of diisopropanolamine in 200 ml of dimethylformamide. The solvent is drawn off when the reaction has been completed. A modified organopolysiloxane having a viscosity of 66,100 mPas/25° C. and containing 4.2% of hydroxyl end groups and 61% of dimethylsiloxane units is obtained.

The results of the water absorption test carried out on cellular elastomers containing chemically incorporated polysiloxanes (A) to (J) are shown in Table 3 below.

TABLE 3

| Polysiloxane | Zero weight (g) | Water absorption (g) | (%) |
|---|---|---|---|
| A | 109.77 | 0.54 | 0.49 |
| B | 105.33 | 0.53 | 0.50 |
| C | 103.20 | 0.57 | 0.55 |
| D | 107.31 | 0.51 | 0.47 |
| E | 106.48 | 0.56 | 0.52 |
| F | 107.55 | 0.52 | 0.48 |
| G | 108.33 | 0.59 | 0.54 |
| H | 104.88 | 0.58 | 0.55 |
| I | 107.27 | 0.57 | 0.53 |
| J | 108.45 | 0.56 | 0.51 |

One important criterion in assessing the suitability of elastomers for the manufacture of shock absorbing and impact resistant buffers is their damping maximum (tangent δ) determined by the torsion vibration test of DIN 53 445. In all of the Examples according to the invention, the elastomers obtained had the same damping maximum of −35° C. as in comparison Example 1(a).

In addition, the molded articles produced according to the invention showed substantially less abrasion than the articles obtained according to Example 1(a).

EXAMPLE 4

(a) Comparison experiment: (without silicone, without aromatic diamine)

A prepolymer was prepared from 100 parts of a linear polyethyleneadipate diol (molecular weight 2000) and 24 parts of 1,5-naphthylene diisocyanate.

2.15 parts of a 50% aqueous solution of a fatty acid sulfonate were mixed vigorously with 124 parts of the isocyanate prepolymer and introduced into the mold which was at a temperature of 70° C. When the mold had been sealed, considerable quantities of the reaction mixture were expelled between the mold and its lid.

The molded product obtained after 30 minutes' heating at 90° C. showed considerable absorption of water in the pressure test under water after numerous deformations. The values obtained are summarized in Table 4 and the results of the dynamic test are summarized in Tables 5 and 6.

(b) Process according to the invention: (silicone plus diamine)

0.2 parts of 1,5-naphthylene diamine and 0.75 parts of a polysiloxane prepolymer which had been obtained by the reaction of 2 mol of organopolysiloxane with 3 mol of tolylene diisocyanate (80% 2,4-isomer) and then with a quantity of diethanolamine which was equimolar to the number of free isocyanate groups were added to 100 parts of the linear polyethyleneadipate diol mentioned above. The isocyanate prepolymer was then prepared from this mixture and 24 parts of 1,5-naphthylene diisocyanate.

2.15 parts of the 50% aqueous solution of a fatty acid sulfonate were then mixed with 124.95 parts of the prepolymer and the mixture was poured into the mold which was at a temperature of 70° C. The molded article could be produced without any leaking from the mold. In the pressure test under water, it showed considerably less water absorption than in the comparison experiment, and this absorption increased only insignificantly after dynamic stress. The cellular polyurethane elastomer was outstandingly uniform in its structure and had a fine cell structure. The product could easily be removed from the mold and its surface was very uniform.

As shown in Tables 5 and 6, the dynamic characteristics of the material were also improved. The higher temperature measured in the rotation flexometer test after 30 minutes is attributed to the higher transverse deflection $S_D$ which is possible in a product of this quality.

(c) Process according to the invention: (with silicone only)

0.75 parts of the organopolysiloxane derivative described under 4(b) were added to 100 parts of the linear polyethyleneadipate diol mentioned above. The isocyanate prepolymer was prepared from this mixture and 24 parts of 1,5-naphthylene diisocyanate. 2.15 parts of a 50% aqueous solution of the fatty acid sulfonate were then mixed vigorously with 124.75 parts of the isocyanate prepolymer and introduced into molds which were at a temperature of 70° C. The molded product could only be obtained with considerable expulsion of reaction mixture during its production, and in the pressure test under water, its water absorption was reduced but after dynamic stress it was higher than in Example 4(b).

EXAMPLE 5

Example 4(b) was repeated but using 0.2 parts of 4,4'-diamino-diphenylmethane and 0.75 parts of a polysiloxane prepolymer which had been prepared by the reaction of 2 mols of organopolysiloxanes with 3 mols of hexamethylene diisocyanate followed by reaction with a quantity of diisopropanolamine equimolar to the number of free isocyanate groups, based on the NH groups of the diisopropanolamine. The results are summarized in Tables 4, 5 and 6.

EXAMPLE 6

Example 4(b) was repeated but using 0.5 parts of 3,3'-dicarbethoxy-4,4'-diamino-diphenylmethane and 0.75 parts of a polysiloxane prepolymer which had been prepared by the reaction of 2 mol of organopolysiloxane with 3 mol of hexamethylene diisocyanate. The results are summarized in Tables 4, 5 and 6.

TABLE 4

Water absorption after 55% deformation of the molded body under water
Test conditions:
15 cycles at a rate of deformation of 100 mm/min.
in which the molded body was left for two minutes each in the compressed and in the relaxed state before the next cycle was begun.
The quantity of water absorbed was determined before and after dynamic stress (55% deformation, 2 HZ, 500,000 cycles).

| Example | Zero weight (g) | Water absorption (% by weight) before and dynamic loading | | after |
|---|---|---|---|---|
| 4(a) | 107.1 | 34 | | — |
| 4(b) | 109.8 | 0.5 | | 0.9 |
| 4(c) | 107.3 | 1.2 | | 24.4 |
| 5 | 102.2 | 0.6 | | 5.2 |
| 6 | 110 | 0.5 | | 4.2 |
| 7 | 107 | 0.45 | | 0.7 |

(Example 4(a) is the comparison experiment to 4(b) and 4(c)).

| Compressive forces (N) | | | | | |
|---|---|---|---|---|---|
| before | | | and | | after |
| 10% | 30% | 50% | 10% | 30% | 50% |
| | | | dynamic loading | | |
| loading | → | → | loading | → | → |
| release | → | → | release | → | → |
| 162.5 | 342.5 | 845 | — | — | — |
| 152.5 | 297.5 | 735 | — | — | — |
| 210 | 530 | 1370 | 145 | 340 | 1000 |
| 170 | 417 | 1140 | 115 | 310 | 895 |
| 160 | 430 | 1130 | 155 | 375 | 1090 |
| 150 | 370 | 1005 | 130 | 285 | 900 |
| 175 | 405 | 1075 | 150 | 350 | 1020 |
| 155 | 345 | 955 | 145 | 285 | 865 |
| 210 | 540 | 1385 | 140 | 325 | 1150 |
| 165 | 415 | 1140 | 100 | 315 | 980 |
| 205 | 530 | 1240 | 145 | 330 | 1080 |
| 150 | 400 | 1080 | 105 | 320 | 1010 |

Measurement of the dynamic properties (according to DIN 53 533, sheet 1 to 3)
1. Compression flexometer (for results of measurements, see Table 5)
Average tension: 1.0 mPa, f = 24 Hz
Surrounding temperature: Room temperature (23 ± 2) °C.
Running time = 1 hour
Measurements of sample: 17.8 mm diameter × 25 mm height.

TABLE 5

| Example | U.W. g/cm³ | Stroke = 4.45 mm | | | Stroke = 6.35 mm | | |
|---|---|---|---|---|---|---|---|
| | | ΔT (°C.) | Flow (%) | Permanent deformation (%) | ΔT (°C.) | Flow (%) | Permanent deformation (%) |
| 4(a)** | 483 | 19.7 | −4.5 | 6.0 | 24.5 | −6.0 | 10.7 |
| 4(b) | 475 | 13.7 | −3.8 | 4.0 | 20.2 | −4.0 | 6 |
| 4(c) | 480 | 16 | −5.8 | 6.5 | 28* | −8.0 | 13 |
| 5 | 486 | 12.0 | −3.0 | 3.8 | 18.2 | −4.1 | 5.8 |
| 6 | 472 | 10.0 | −3.3 | 4.1 | 17.8 | −3.7 | 5.3 |

*Sample discolored internally
**Comparison Example
U.W. = unit weight
2. Rotation flexometer (for results of measurements, see Table 6)
Test sample:
$d_o = 0.0$ mm
$h_o = 20.0$ mm, $A_o = 314$ mm²
Frequency = 25 Hz, surrounding temperature: room temperature (23 ± 2) °C.
Constant: axial deformation $\Delta^h = 6.0$ mm
Parameter of test: transverse deflection Sa.

TABLE 6

| Example | Density (g/dm³) | ΔT measurement $S_a = 2.0$ mm t = 20 min. (°C.) | Final running time = 30 minutes | | | |
|---|---|---|---|---|---|---|
| | | | $S_D$ (mm) | $\tau_D$ (mPa) | ΔT (°C.) | $\gamma_D = S_D/(h_o/\text{minus})$ [1] |
| 4(a)* | 483 | 52 | 2.4 | 0.16 | 69 | 0.17 |
| 4(b) | 475 | 33 | 3.8 | 0.097 | 92 | 0.27 |
| 4(c) | 480 | 56 | 2.0 | 0.089 | 72 | 0.14 |
| 5 | 486 | 32 | 3.5 | 0.08 | 63 | 0.25 |
| 6 | 472 | 36 | 3.7 | 0.085 | 64 | 0.26 |

$S_a$ = amplitude of transverse deflection
$S_D$ = permanent transverse deflection $S_a$ at $N_D$
$\gamma_D$ permanent distortion $S_D/h_o - \Delta h$
$\tau_D$ = fatigue strength $Q_D/A_o$
$\Delta_T$ = temperature increase
$Q_D$ = force required to apply the permanent transverse deflection $S_D$
*comparison Example

EXAMPLE 7

Example 4(b) was repeated but the internal walls of the mold which was at a temperature of 70° C. were sprayed with a 40% aqueous PUR dispersion, using a spray gun, before the reactive mixture was poured into the mold. When the PUR dispersion was thus introduced, the water evaporated instantaneously and a uniform film (0.2 mm) was left behind on the wall of the mold. The reactive mixture obtained from Example 4(b) was then introduced into the mold which had been prepared in this manner. When the molded product was removed from the mold, its whole surface was covered with the polyurethane film which adhered to it firmly. In compression tests carried out under water, the buffer was found to have considerably reduced water absorption compared with the comparison sample and this increased only slightly after dynamic loading.

EXAMPLE 8

(a) Preparation of a 20% solution of a modified organopolysiloxane in polyethyleneadipate diol 1100 g of an α,ω-hydroxymethylpolydimethylsiloxane with a hydroxyl number of 80 and 333 g of 1-isocyanato-3,3,5-trimethyl-5-isocyanatomethylcyclohexane (IPDI) are heated to 70° C. until an NCO content of 3.25% is reached. The NCO siloxane prepolymer is continuously added into a mixture of 4650 g of a linear polyethylenedipate diol (OH number 56) and 117 g of diethanolamine and kept at 40° C. until no NCO is detectable. The reaction of the NCO prepolymer with the aminoalcohol in the presence of the higher molecular polyhydroxyl compound (B) (which is also used for the synthesis of the cellular elastomer) allows the OH functional siloxane prepolymer to be mixed with the solution of the polyhydroxyl compound (B) with an essentially lower viscosity (650 mPas at 80° C.) than in the preparation of the hydroxy functional siloxane prepolymer without the presence of (B) (4000 mPas at 80° C.).

(b) Reaction according to the invention

The reaction is conducted according to Example 3; however, the quantities of Example 3 are changed to use 3.75 parts of the 20% silicone containing mixture of Example 8(a) and 97 parts of the linear polyethyleneadipate diol of Example 1(b).

| Zero weight | Water absorption | |
|---|---|---|
| (g) | (g) | (%) |
| 108.75 | 0.59 | 0.54 |

The 40% aqueous PUR-dispersion used in Example 7 for in-mold-coating is a weakly anionic dispersion with 50 milliequivalents of $SO_3Na$-groups/kg solid polyurethane, based on a poly ester urethane, prepared from a NCO-prepolymer, made by reaction of an adipic acid/hexanediol 1,6/neopentylglycol-polyester and an equimolar mixture of hexane-1,6-diisocyanate and isophorone-diisocyanate (1:2), chain extended with isophorone-diamine and $NH_2 \cdot CH_2 \cdot CH_2 \cdot NH \cdot CH_2 \cdot CH_2 \cdot SO_3Na$ in about equimolar (NCO/NH₂) quantities. To the dispersion are added 0,12% of formaldehyde (40%)-solution and 0,2% weight percent of N-Methylol-chloracetamide.

What is claimed is:

1. A method of producing an impermeable, fine cellular polyurethane elastomer having a density of from 0.3 to 0.8 g/cm³ comprising reacting
   (A) organic polyisocyanates,
   (B) polyhydroxyl compounds having a molecular weight of from 400 to 6000, and
   (C) water, the equivalent ratio of isocyanate groups to isocyanate reactive compounds in the formulation being within the range of from 0.95:1 to 1.15:1, characterized in that from 0.1 to 3% by weight of one or more organofunctional polysiloxanes corresponding to the general formula

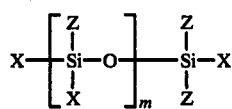 (I)

in which
m represents an integer of from 1 to 500, the groups Z which may be the same or different represent $C_1$-to $C_5$-alkyl or $C_6$-to $C_{15}$-aryl or siloxyl groups and the groups
X have the same meaning as Z, with the proviso that at least 1, but not more than 5 of the radicals X represent H—Y—R groups, in which
Y represents —NR'—, —O—

or —S—,
R represents a $C_1$-to $C_6$-alkylene group which may contain hetero atoms, and
R' represents hydrogen, a $C_1$-to $C_6$-alkyl group or a $C_5$-to $C_9$-cycloalkyl group
are added to the reaction mixture.

2. The method of claim 1, wherein, when X represents 2 H—Y—R groups, the organofunctional silicones are converted into OH-functional silicone prepolymers by reaction with polyisocyanates and excess quantities of polyvalent chain-lengthening agents.

3. The method of claim 1, wherein the reaction mixture further comprises
   (D) from 0.1 to 0.8%, by weight, based on the whole mixture, of organic chain-lengthening agents having at least two isocyanate reactive hydrogen atoms and a molecular weight of from 108 to 400, and
   (E) catalysts and/or other known auxiliary agents and additives.

4. The method of claim 1, characterized in that m represents an integer of from 1 to 100.

5. The method of claim 4 characterized in that m represents an integer from 5 to 30, Z represents methyl groups and two of the groups X are H—Y—R groups.

6. The method of claim 4 or claim 5 characterized in that Y represents an oxygen atom.

7. The method of claim 1, characterized in that mixtures of
   (a) organofunctional polysiloxanes in which X represents 2 H—Y—R groups, and
   (b) polysiloxanes in which X=Z and all of the groups X=Z are methyl and, possibly, phenyl groups
are used in proportions by weight within the range of from 4:1 to 1:4.

8. The method of claim 1 characterized in that organofunctional polysiloxanes which have been prepolymerized by reaction of the groups H—Y—R with an excess of polyisocyanate, which may be followed by a reaction with an amino polyol or an amino polyol which is dissolved in component (B).

9. The method of claim 3, characterized in that the organic chain-lengthening agents are aromatic diamines having a molecular weight of from 108 to 250.

10. The method of claim 1, characterized in that the organic polyisocyanate is 1,5-naphthylene diisocyanate.

11. The method of claim 1, characterized in that the organic polyisocyanate is 1,5-naphthylene diisocyanate and the chain-lengthening agent is 1,5-diaminonaphthalene.

12. The method of claim 1, characterized in that 0.5 to 2.0%, by weight, of water is used.

* * * * *

UNITED STATES PATENT AND TRADEMARK OFFICE
CERTIFICATE OF CORRECTION

PATENT NO. : 4,350,777
DATED : September 21, 1982
INVENTOR(S) : Paul Henrichs, Peter Haas, Hans-Georg Hoppe, Wolfgang Grimm It is certified that error appears in the above—identified patent and that said Letters Patent is hereby corrected as shown below:

At column 13, line 11, "which" should be --with--, at column 14, line 3, "most" should be --more--. At column 21, line 63, please correct the spelling of "polyethylenedipate" to --polyethyleneadipate--.

Signed and Sealed this

Tenth Day of April 1984

[SEAL]

Attest:

Attesting Officer

GERALD J. MOSSINGHOFF

Commissioner of Patents and Trademarks